United States Patent [19]
Lin et al.

[11] Patent Number: 5,985,463
[45] Date of Patent: Nov. 16, 1999

[54] COATING CONTAINING HYDROXY CONTAINING ACRYLOSILANE POLYMER TO IMPROVE MAR AND ACID ETCH RESISTANCE

[75] Inventors: Jun Lin, Madison Heights; John David Nordstrom, Huntington Woods, both of Mich.

[73] Assignee: E.I. du Pont de Nemours and Company, Wilmington, Del.

[21] Appl. No.: 09/103,852

[22] Filed: Jun. 24, 1998

[51] Int. Cl.[6] ........................................................ B32B 9/04
[52] U.S. Cl. ........................... 428/447; 524/770; 524/837; 524/853; 524/858; 525/123; 525/124; 525/127; 525/377
[58] Field of Search ..................................... 525/123, 124, 525/127, 377; 428/447; 524/770, 837, 853, 858

[56] References Cited

U.S. PATENT DOCUMENTS

| | | | |
|---|---|---|---|
| H1279 | 1/1994 | Stephenson | 524/317 |
| 4,499,150 | 2/1985 | Dowbenko et al. | 428/447 |
| 5,066,698 | 11/1991 | Hazan et al. | 524/269 |
| 5,162,426 | 11/1992 | Hazan et al. | 524/521 |
| 5,182,174 | 1/1993 | Stephenson | 428/450 |
| 5,225,248 | 7/1993 | Stephenson | 427/333 |
| 5,230,962 | 7/1993 | Stephenson | 428/423.1 |
| 5,244,696 | 9/1993 | Hazan et al. | 427/402 |
| 5,244,959 | 9/1993 | Hazan et al. | 524/504 |
| 5,250,605 | 10/1993 | Hazan et al. | 524/504 |
| 5,268,215 | 12/1993 | Krenceski et al. | 428/213 |
| 5,281,443 | 1/1994 | Briggs et al. | 427/407.1 |
| 5,281,468 | 1/1994 | Klier et al. | 428/209 |
| 5,286,569 | 2/1994 | Werner, Jr. et al. | 428/423.1 |
| 5,290,633 | 3/1994 | Devlin et al. | 428/423.1 |
| 5,356,669 | 10/1994 | Rehfuss et al. | 427/407.1 |
| 5,367,004 | 11/1994 | Barsotti et al. | 523/414 |
| 5,369,153 | 11/1994 | Barsotti et al. | 523/429 |
| 5,376,706 | 12/1994 | Barsotti et al. | 523/434 |
| 5,412,049 | 5/1995 | Argyropoulos et al. | 526/312 |
| 5,413,809 | 5/1995 | Hazan | 427/140 |
| 5,439,747 | 8/1995 | Sturdevant et al. | 428/447 |
| 5,474,811 | 12/1995 | Rehfuss et al. | 427/407.1 |
| 5,532,027 | 7/1996 | Nordstrom et al. | 427/493 |
| 5,552,497 | 9/1996 | Taylor et al. | 525/456 |
| 5,559,195 | 9/1996 | McGee et al. | 525/383 |
| 5,605,965 | 2/1997 | Ruhfuss et al. | 525/100 |
| 5,612,416 | 3/1997 | McCollum et al. | 525/123 |
| 5,646,213 | 7/1997 | Guo | 524/562 |
| 5,684,084 | 11/1997 | Lewin et al. | 524/590 |

*Primary Examiner*—Melvyn I. Marquis
*Attorney, Agent, or Firm*—Hilmar L. Fricke

[57] ABSTRACT

A coating composition particularly useful as a clear coating used over a pigmented base coat that has improved resistance to marring and to acid etching when exposed to natural weathering conditions containing 40–70% by weight of film forming binder and 30–60% by weight of a volatile liquid carrier for the binder; wherein the binder contains a. 50–90% by weight, based on the weight of the binder, of an acrylosilane polymer of polymerized monomers from the following group: an alkyl methacrylate, an alkyl acrylate, each having 1–12 carbon atoms in the alkyl group, cycloaliphatic alkyl methacrylate, cycloaliphatic alkyl acrylate, styrene or any mixture of these monomers; hydroxy containing monomers from the following group: hydroxy alkyl methacrylate, hydroxy alkyl acrylate each having 1–4 carbon atoms in the alkyl group, or any mixtures of these monomers; and a mono-ethylenically unsaturated silane monomer; and the polymer having a weight average molecular weight of 1,000–15,000 determined by gel permeation chromatography.

b. 10–50% by weight, based on the weight of the binder of an organic polyisocyanate; and wherein the ratio of isocyanate groups of the organic polyisocyanate to hydroxy groups of the of the acrylosilane polymer is about 0.4:1 to 1.3:1.

11 Claims, No Drawings

COATING CONTAINING HYDROXY CONTAINING ACRYLOSILANE POLYMER TO IMPROVE MAR AND ACID ETCH RESISTANCE

BACKGROUND OF THE INVENTION

1. Field of the Invention

This invention is directed to coating compositions, in particular to a clear coating composition used as a clear coat over a color coating or base coating of a motor vehicle that has improved mar and acid etch resistance.

2. Description of the Prior Art

Acid rain and other air pollutants have caused problems of water spotting and acid etching of finishes used on automobiles and trucks. The finish of choice presently being used on the exterior of automobiles and trucks is a clear coat/color coat finish in which a clear coating is applied over a color coating or base coating which is pigmented to provide protection to the color coat and improve the appearance of the overall finish such as gloss and distinctness of image. Another problem is mar resistance of the clear coat. Marring of the finish can be caused by mechanical washing procedures used in a typical commercial car wash or by other mechanical marring of the finish.

A number of clear coatings containing acrylosilane polymers have been used as clear coats as shown in Hazan et al U.S. Pat. No. 5,066,698 issued Nov. 19, 1991, Nordstrom et al U.S. Pat. No. 5,532,027 issued Jul. 2, 1996 and Lewin et al U.S. Pat. No. 5,684,084 issued Nov. 4, 1997. However, none of the compositions shown in the above patents have the necessary combination of properties including costs that are desired for an automotive OEM (original equipment manufacturing) clear coating composition.

There is a need for an OEM clear coating compositions that will form finishes that are resistant to acid etching and water spotting caused by acid rain and are resistant to marring.

SUMMARY OF THE INVENTION

A coating composition containing 40–70% by weight of film forming binder and 30–60% by weight of a volatile liquid carrier for the binder; wherein the binder contains a. 50–90% by weight, based on the weight of the binder, of an acrylosilane polymer of polymerized monomers from the following group: an alkyl methacrylate, an alkyl acrylate, each having 1–12 carbon atoms in the alkyl group, cycloaliphatic alkyl methacrylate, cycloaliphatic alkyl acrylate, styrene or any mixture of these monomers; hydroxy containing monomers from the following group: hydroxy alkyl methacrylate, hydroxy alkyl acrylate each having 1–4 carbon atoms in the alkyl group, or any mixtures of these monomers; and a mono-ethylenically unsaturated silane monomer; and the polymer having a weight average molecular weight of 1,000–15,000 determined by gel permeation chromatography;

b. 10–50% by weight, based on the weight of the binder of an organic polyisocyanate; and wherein the ratio of isocyanate groups of the organic polyisocyanate to hydroxy groups of the of the acrylosilane polymer is 0.4:1 to 1.3:1.

DETAILED DESCRIPTION OF THE INVENTION

The coating composition of this invention is general used as a clear coating composition that is applied over a base coat which is a pigmented coating composition. Clear coat/color coat finishes are conventionally used on the exterior of automobiles and trucks. The coating composition of this invention forms a clear finish, has improved mar resistance, acid etch resistance, and water spot resistance.

For a typical auto or truck body, steel sheet is used or a plastic or a composite can be used. If steel is used, it is first treated with an inorganic rust-proofing compound such as zinc or iron phosphate and then a primer coating is applied by electrodeposition. Typically, these electrodeposition primers are epoxy modified resins crosslinked with a polyisocyanate and are applied by a cathodic electrodeposition process. Optionally, a primer can be applied over the electrodeposited primer usually by spraying to provide for better appearance and/or improved adhesion of the basecoat to the primer. A pigmented basecoat or color coat then is applied. A typical color coat comprises pigment which can include metallic flake pigments such as aluminum flake or pearl flake pigments, a film forming binder which can be a polyurethane, an acrylourethane, an acrylic polymer or a silane polymer, and contains a crosslinking agent such as an aminoplast, typically, an alkylated melamine formaldehyde crosslinking agent or a polyisocyanate. The basecoat can be solvent or water borne and can be in the form of a dispersion or a solution.

A clear coat or top coat then is applied to the color coat or basecoat before the basecoat is fully cured and the basecoat and clear coat are then fully cured usually by baking at 100–150° C. for 15–45 minutes. The basecoat and clear coat preferably have a dry coating thickness of 2.5–75 microns and 25–100 microns, respectively.

The clear coat composition of this invention contains 40–70% by weight of a film forming binder and 30–60% of a volatile organic liquid carrier which usually is a solvent for the binder and volatilizes at 35° C. and above. The clear coat also can be in dispersion form. The film forming binder of the clear coat composition contains 50–90% by weight of an acrylosilane polymer having reactive silane and hydroxyl groups and 10–50% by weight of an organic polyisocyanate crosslinking agent.

The acrylosilane polymer comprises polymerized non silane containing monomers of alkyl methacrylates, alkyl acrylate, each having 1–12 carbon atoms in the alkyl groups, cycloaliphatic alkyl methacrylate, cycloaliphatic alkyl acrylate, styrene or mixtures of any of the above monomers. The polymer contains polymerized hydroxy containing monomers such as hydroxy alkyl methacrylate, hydroxy alkyl acrylate each having 1–4 carbon atoms in the alkyl group or a mixture of these monomers and contains polymerized mono ethylenically unsaturated silane monomers. The acrylosilane polymer has a weight average molecular weight of 1,000–15,000.

All molecular weights disclosed herein are determined by gel permeation chromatography (GPC).

Preferred acrylosilane polymers contain 35–75% by weight of polymerized alkyl methacrylate or alkyl acrylate or styrene monomers or mixtures thereof, 20–40% by weight of polymerized hydroxy alkyl methacrylate or acrylate monomers or mixtures thereof and 5–25% by weight of the mono ethylenically unsaturated silane monomer.

One preferred acrylosilane polymer is the polymerization product of 35–75% by weight of non silane containing monomers of an alkyl methacrylate, an alkyl acrylate each having 1–8 carbon atoms in the alkyl group, styrene or mixtures of these monomers; 20–40% by weight of hydroxy alkyl methacrylate having 1–4 carbon atoms in the alkyl group; and 5–25% by weight of a mono-ethylenically unsaturated silane containing monomer.

Typically useful ethylenically unsaturated non-silane containing monomers are alkyl acrylates, alkyl methacrylates where the alkyl groups have 1–12 carbon atoms such as methyl methacrylate, ethyl methacrylate, propyl methacrylate, butyl methacrylate, isobutyl methacrylate, pentyl methacrylate, hexyl methacrylate, octyl methacrylate, nonyl methacrylate, lauryl methacrylate; methyl acrylate, ethyl acrylate, propyl acrylate, butyl acrylate, isobutyl acrylate, pentyl acrylate, hexyl acrylate, octyl acrylate, nonyl acrylate, and lauryl acrylate. Cycloaliphatic alkyl methacrylates and acrylates also can be used, for example, such as cyclohexyl methacrylate, cyclohexyl acrylate, trimethylcyclohexyl methacrylate, trimethylcyclohexyl acrylate, iso-butyl methacrylate, t-butyl cyclohexyl acrylate, t-butyl cyclohexyl methacrylate, isobornyl methacrylate, isobornyl acrylate and the like. Aryl acrylate and aryl methacrylates also can be used, for example, such as benzyl acrylate and benzyl methacrylate. Mixtures of two or more of the above mentioned monomers are useful in formulating the polymer with the desired characteristics.

In addition to alkyl acrylates or methacrylates, other non-silane containing polymerizable monomers in amounts up to 50% by weight of the polymer can be used in a silane polymer for the purpose of achieving the desired physical properties such as hardness, appearance, and mar resistance. Exemplary of such other monomers are styrene, methyl styrene, acrylamide, acrylonitrile, and methacrylonitrile. Styrene can be used in the range of 0–50% by weight.

Hydroxy functional monomers may be incorporated into the silane polymer to produce a polymer having a hydroxy number of 20 to 200. Typically useful hydroxy functional monomers are hydroxy alkyl methacrylates and acrylates such as hydroxy ethyl methacrylate, hydroxy propyl methacrylate, hydroxy butyl methacrylates, hydroxy isobutyl methacrylate, hydroxy ethyl acrylate, hydroxy propyl acrylate, and hydroxy butyl acrylate.

Typical commercial hydroxy functional monomers may contain up to 1% acrylic or methacrylic acid. During polymerization the acid can cause side reactions involving the silane monomers that broaden the molecular weight distribution of the acrylic polymer which will have harmful effects on solids content of paint, stability of paint and even cause gelation during copolymer preparation. Preferably the acid content of these hydroxy monomers should be limited to about 0.1%.

A suitable silane containing monomer useful in forming a acrylosilane polymer is a silane having the following structural formula:

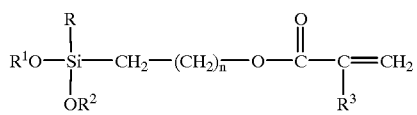

wherein R is either $CH_3$, $CH_3CH_2$, $CH_3O$, or $CH_3CH_2O$; $R^1$ and $R^2$ are $CH_3$ or $CH_3CH_2$; $R_3$ is either H, $CH_3$, or $CH_3CH_2$; and n is 0 or a positive integer from 1 to 10. Preferably, R is $CH_3O$ or $CH_3CH_2O$ and n is 1.

Typical examples of such silanes are the acrylate alkoxy silanes, such as gamma acryloxypropyltrimethoxy silane and the methacrylatoalkoxy silanes, such as gamma-methacryloxypropyltrimethoxy silane or gamma trimethoxy silyl propyl methacrylate, and gamma trimethoxy silyl propyl acrylate, and gamma-methacryloxypropyltris(2-methoxyethoxy) silane.

Other suitable silane monomers have the following structural formula:

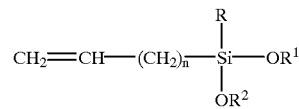

wherein R, $R^1$ and $R^2$ are as described above and n is a positive integer from 1 to 10.

Examples of such silanes are the vinylalkoxy silanes, such as vinyltrimethoxy silane, vinyltriethoxy silane and vinyltris (2-methoxyethoxy) silane.

Other useful silane containing monomers are acyloxysilanes, including acrylatoxy silane, methacrylatoxy silane and vinylacetoxy silanes, such as vinylmethyl diacetoxy silane, acrylatopropyl triacetoxy silane, and methacrylatopropyltriacetoxy silane. Mixtures of the above-mentioned silane-containing monomers are also suitable.

Consistent with the above mentioned components of the acrylosilane polymer, the following is an example of an acrylosilane polymer useful in the coating composition of this invention that contains the following constituents: 15–30% by weight styrene, 30–50% by weight isobutyl methacrylate, 15–30% by weight hydroxy ethyl methacrylate, and 15–30% by weight of methacryloxypropyl trimethoxy silane.

Typical polymerization catalysts used to form the acrylosilane polymer are azo type catalysts such as azo-bis-isobutyronitrile, acetate catalysts such as t-butyl peracetate, di-t-butyl peroxide, t-butyl perbenzoate, and t-butyl peroctoate.

Typical solvents that can be used to polymerize the monomers and to form the coating composition are ketones such as methyl amyl ketone, isobutyl ketone, methyl ethyl ketone, aromatic hydrocarbons solvents such as toluene, xylene, "Solvesso" 100 aromatic solvent, ethers, esters, alcohols, acetates and mixtures of any of the above.

The coating composition can contain from 1–20% by weight of a polyester resin which is the esterification product of an aliphatic dicarboxylic acid, a polyol having at least three reactive hydroxyl groups, a diol, a cyclic anhydride and a cyclic alcohol and having a number average molecular weight of 500–4,000. One preferred polyester resin is the esterification product of adipic acid, trimethylol propane, hexanediol, hexahydrophathalic anhydride and cyclohexane dimethalol.

Also, the coating composition can contain from 1–20% by weight of an hydroxy functional acrylic resin (without silane functionality).

The coating composition also contains an organic polyisocyanate crosslinking agent. Any of the conventional aromatic, aliphatic, cycloaliphatic, isocyanates, trifunctional isocyanates and isocyanate functional adducts of a polyol and a diisocyanate can be used. Typically useful diisocyanates are 1,6-hexamethylene diisocyanate, isophorone diisocyanate, 4,4'-bisphenylene diisocyanate, toluene diisocyanate, bis cyclohexyl diisocyanate, tetramethylene xylene diisocyanate, ethyl ethylene diisocyanate, 2,3-dimethyl ethylene diisocyanate, 1-methyltrimethylene diisocyanate, 1,3-cyclopentylene diisocyanate, 1,4-cyclohexylene diisocyanate, 1,3-phenylene diisocyanate, 1,5-naphthalene diisocyanate, bis-(4-isocyanatocyclohexyl)-methane, and 4,4'-diisocyanatodiphenyl ether.

Typical trifunctional isocyanates that can be used are triphenylmethane triisocyanate, 1,3,5-benzene triisocyanate, and 2,4,6-toluene triisocyanate. Trimers of diisocyanates also can be used. These trimers may be biurets or isocyanurates. Examples are sold under the trade names of "Desmodur" N3300 or "Tolonate" HDT. These trimers also contain higher oligomers such as pentamers, heptamers, etc. which are generated during the process of preparing theses trimers.

One useful isocyanurate is the isocyanurate of isophorone diisocyanate.

Isocyanate functional adducts can be used that are formed from an organic polyisocyanate and a polyol. Any of the aforementioned polyisocyanates can be used with a polyol to form an adduct. Polyols such as trimethylol alkanes like trimethylol propane or ethane can be used. One useful adduct is the reaction product of tetramethylxylidene diisocyanate and trimethylol propane and is sold under the trade name "Cythane" 3160.

Curing catalysts, generally are used in the coating composition in amounts of 0.1–5% by weight, based on the weight of the binder, for catalyzing the crosslinking between silane moieties and hydroxy moieties of the acrylosilane polymer with the isocyanate moieties of the polyisocyanate. Preferred is a mixture of a blocked sulfonic acid catalyst and an alkyl or aryl acid phosphate catalyst such as butyl acid phosphate or phenyl acid phosphate. Typical blocked acid catalyst are dodecyl benzene sulfonic acid blocked with an amine such as amino methyl propanol. Blocked toluene sulfonic acid can also be used.

In a two component composition wherein component A contains the acrylosilane polymer, blocked acid catalyst is added to this component and the acid phosphate catalyst is added to component B which contains the polyisocyanate crosslinking agent. Just before application components A and B are mixed together and applied usually by spraying or electrostatic spraying.

Other catalysts can be used and include dibutyl tin dilaurate, dibutyl tin diacetate, dibutyl tin dichloride, dibutyl tin dibromide, triphenyl boron, tetraisopropyl titanate, triethanolamine titanate chelate, dibutyl tin dioxide, dibutyl tin dioctoate, tin octoate, aluminum titanate, aluminum chelates, zirconium chelate, and other such catalysts or mixtures thereof known to those skilled in the art. Tertiary amines and acids or combinations thereof are also useful for catalyzing silane bonding. Other silane curing catalysts are disclosed in U.S. Pat. No. 4,923,945, column 15 to column 17, herein incorporated by reference.

To improve the weatherability of the clear coat, ultraviolet light stabilizers or a combination of ultraviolet light stabilizers can be added to the clear coat composition in the amount of 0.1–10% by weight, based on the weight of the binder. Such stabilizers include ultraviolet light absorbers, screeners, quenchers, and specified hindered amine light stabilizers. Also, an antioxidant can be added, in the amount 0.1–5% by weight, based on the weight of the binder.

Typical ultraviolet light stabilizers that are useful include benzophenones, triazoles, triazines, benzoates, hindered amines and mixtures thereof. Specific examples of ultraviolet stabilizers are disclosed in U.S. Pat. No. 4,591,533, the entire disclosure of which is incorporated herein by reference. For good durability, a blend of "Tinuvin" 1130, "Tinuvin" 384 and "Tinuvin" 123 (hindered amine), all commercially available from Ciba-Geigy, is preferred.

The clear coating composition may also include other conventional formulation additives such as flow control agents, for example, such as Resiflow™ S (polybutylacrylate), BYK™ 320 and 325 (high molecular weight polyacrylates); and rheology control agents, such as fumed silica.

Conventional solvents and diluents described above are used to disperse an/or dilute the above mentioned polymers of the clear coating composition.

Typical basecoats used in combination with the clear coating composition, comprise as the film forming binder a polyurethane, an acrylourethane, a silane resin, an acrylic resin and a crosslinking agent such as a polyisocyanate or an alkylated melamine resin. The basecoat can be waterborne or solvent based solution or dispersion. The basecoat contains pigments such as are conventionally used including metallic flake pigments such as aluminum flake.

Both the basecoat and the clear coat are applied by conventional techniques such as spraying, electrostatic spraying, dipping, brushing, and flow coating.

The following examples illustrate the invention. All parts and percentages are on a weight basis unless otherwise indicated. Molecular weights are determine by GPC (Gel Permeation Chromatography) using polymethyl methacrylate as the standard.

EXAMPLE 1

An acrylosilane polymer solution was prepared by copolymerizing in the presence of a 2/1 Solvesso 100 Aromatic Solvent/butanol mixture 134 parts by weight styrene (S), 134 parts by weight hydroxyethyl methacrylate (HEMA), 134 parts by weight methacryloxypropyl trimethoxy silane (MAPTS) and 268 parts by weight isobutyl methacrylate (IBMA) in the presence of 53.6 parts by weight Vazo® 67[4]. The resulting polymer solution has a 67% solids content and a viscosity of X-Y on the Gardner Holdt scale measured at 25° C. The polymer composition is 20%S/20%HEMA/20%MAPTS/40%IBMA and has a weight average molecular weight of 4800.

A coating composition was formulated by blending together the following ingredients:

|  | Parts by Weight |
|---|---|
| Portion A | |
| Acrylosilane Polymer Solution (prepared above) | 80.0 |
| UV and Hindered Amine Light Stabilizers (HALS) 19.7% Tinuvin ® 1130[1], 16.7% Tinuvin ® 384[1], 4.1% Tinuvin ® 123[1] and 14.7% Tinuvin ® 079[1] in 44.8% Solvesso !00 Aromatic Solvent) | 4.3 |
| "Resiflow" S[2] (50% A solids of a flow control agent of polybutylacrylate in Solvesso 100 Aromatic Solvent) | 0.2 |
| Dodecylbenzene Sulfonic Acid Solution (33% solids in methanol and blocked with amino methyl propanol) | 1.3 |
| Solvesso 100 Aromatic Solvent | 10.0 |
| Ethyl 3-Ethoxy Propionate | 12.0 |
| Portion B | |
| Hexamethylene Diisocyanate Trimer Solution (72% solids Desmodur ® 3300[3] in a 50/35/15 by weight mixture of n-butanol, xylene and aromatic hydrocarbon solvent) | 24.0 |
| Total | 131.8 |

Sources of above constituents are:

1. Product of Ciba Specialty Chemical Company
2. Product of King Industries Inc.
3. Product of Bayer Corp.
4. Product of E. I. du Pont de Nemours and Company Portion A was charged into a mixing vessel and mixed and then Portion B was added and mixed to form the coating composition containing 76% by weight acrylosilane polymer and 24% by weight isocyanate. The coating composition was reduced to a spray viscosity 35 seconds measured on a #2 Fisher with ethyl 3-ethoxy propionate.

Steel panels electrocoated with a conventional primer were spray coated with a black waterborne polyester modified acrylic melamine basecoat and after a 10 minute wait were prebaked for 10 minutes at 83° C. and then the above prepared clear coating composition was sprayed on to provide a 2 mil thick film when cured and then the panels were baked at 120° C. for 30 minutes to form a basecoat/clear coat coating having a gloss of greater than 80 on 20° gloss meter and a hardness of 12 knoop units measured with a Tukon Hardness Machine.

EXAMPLE 2

An acrylosilane polymer (B) solution was prepared by copolymerizing 108 parts of a mixture of monomer/initiator (20 parts styrene, 30 parts hydroxyethyl methacrylate, 10 parts gamma-methacryloxypropyl trimethoxy silane, 28 parts isobutylmethacrylate, 12 parts ethylhexylacrylate, 8 parts Vazo® 67) in 60 parts of a refluxing mixture of 2/1 aromatic 100/n-butanol solvent. The resulting resin solution was 66% solids, had a Gardner-Holt viscosity of X+, and a Mw of 5100 as determined by GPC.

A coating composition was formulated by blending the following ingredients:

|  | Parts by Weight |
|---|---|
| Portion A |  |
| Acrylosilane Polymer B | 100.0 |
| UV/HALS solution (described in Ex. 1) | 5.4 |
| Resiflow S | 0.3 |
| Dodecylbenzene sulfonic acid solution (described in Ex. 1) | 1.7 |
| Aromatic 100 solvent | 12.5 |
| Ethyl-3-ethoxy propionate | 15.0 |
| Portion B |  |
| Desmodur® 3300 Solution (72% solids described in Ex. 1) | 37.5 |
| Albright® PA-75 phenyl acid phosphate | 0.6 |
| Total | 173.0 |

A clearcoat was prepared and sprayed over a black waterborne basecoat in the same manner as described in Example 1. The basecoat/clearcoat was baked at 130° for 30 minutes.

The results of testing is shown in Chart I.

COMPARATIVE EXAMPLE 3

This example illustrates a nonsilane containing two component urethane clearcoat with good etch resistance but poor mar resistance.

An hydroxyl functional acrylic polymer (C) solution was prepared by copolymerizing 104 parts of a mixture of monomer/initiator (25 parts styrene, 32 parts hydroxyethylacrylate, 43 parts n-butyl methacrylate, 4 parts Vazo® 67) in 60 parts of a refluxing mixture of 9/1 aromatic 100/n-butyl acetate solvent. The resulting resin solution was 66% solids, had a Gardner-Holt viscosity of Y−, and a Mw of 5300 as determined by GPC.

A clearcoating was prepared by blending 2.6 parts of Portion A (below) with 1 part of Portion B (below):

|  | Parts by Weight |
|---|---|
| Portion A |  |
| Acrylic Polymer C (described above) | 100.0 |
| UV/HALS Solution (see Example 1) | 7.2 |
| 50% Xylene Solution of Resiflow ®S | 0.4 |
| 75% solution of phenyl acid phosphate in butanol | 0.5 |
| n-butanol | 10.0 |
| Aromatic 100 solvent | 20.1 |
| Ethyl 3-ethoxy propionate | 13.4 |
| Portion B |  |
| Desmodur® 3300 | 39.4 |
| Desmodur® 4470 solution³ | 39.2 |
| Aromatic 100 solvent | 2.2 |
| Butyl Acetate | 7.7 |
| Ethyl 3-ethoxy propionate | 6.0 |
| Xylene | 5.5 |

A clearcoat was sprayed over a black waterborne basecoat in the same manner as described in Example 1. The basecoat/clearcoat was basked at 130° C. for 30 minutes.

The results of testing in shown in Chart I.

COMPARATIVE EXAMPLE 4

This example illustrates a non-silane containing 2K urethane clearcoat with good mar resistance but poor etch resistance.

A clearcoating was prepared by blending 2.6 parts of Portion A (below) with 1 part of Portion B (below).

|  | Parts by Weight |
|---|---|
| Portion A |  |
| Acrylic Polymer C (described in Example 3) | 100.0 |
| UVA/HALS Solution (described in Example 1) | 7.3 |
| 50% Xylene Solution of Resiflow ®S | 0.4 |
| Butyl benzyl phthalate | 6.0 |
| 75% solution of phenyl acid phosphate in butanol | 0.1 |
| n-butanol | 10.0 |
| Ethyl 3-ethoxy propionate | 18.3 |
| Portion B |  |
| Desmodur® 3300 | 72.0 |
| n-butanol | 14.0 |
| Xylene | 10.0 |
| Aromatic 100 solvent | 4.0 |

A clearcoat was prepared and sprayed over a black waterborne basecoat in the same manner as described in Example 1. The basecoat/clearcoat was baked at 130° C. for 30 minutes.

The results of testing is shown in Chart I.

Chart I

| Clearcoat |  | Example 1 (20/20) | Example 2 (30/10) | Comp. Ex. 3 Good Etch | Comp. Ex. 4 Good Mar |
|---|---|---|---|---|---|
| Hardness | Tukon | 11 | 12 | 13 | 11 |
| Etch Resistance (Note 1) | Note 1 | 65° | 60° | 60° | 45° |
| Mar Resistance (Note 2) | Note 2 | 7 | 5 | 9 | 7 |

-continued

Chart I

| Clearcoat | Example 1 (20/20) | Example 2 (30/10) | Comp. Ex. 3 Good Etch | Comp. Ex. 4 Good Mar |
|---|---|---|---|---|

Note 1 Lowest temperature (° C.) where etching occurs on gradient oven test.
Note 2 Damage generated on Benchtop Car Wash (5 = good, 10 = poor).

Test Methods
Etch Resistance

Panels which have cured clearcoat over black basecoats are placed on a gradient oven with surface temperature ranging from 45 to 85° C. The panels are spotted (200 microliter) with a 1 pH acid solution along the gradient. After a 30 minute exposure, the spots are washed off with deionized water.

Mar Resistance

A benchtop carwash machine is used to inflict damage on cured panels with clearcoat over black basecoat. The method is described in General Motors Engineering Standards Specification Test GM 9707P.

We claim:

1. A coating composition comprising 40–70% by weight of film forming binder and 30–60% by weight of a volatile liquid carrier for the binder; wherein the binder comprises
   a. 50–90% by weight, based on the weight of the binder, of an acrylosilane polymer consisting essentially of polymerized monomers of a mono ethylenically unsaturated silane monomer, monomers selected from the group consisting of an alkyl methacrylate, an alkyl acrylate, each having 1–12 carbon atoms in the alkyl group, cycloaliphatic alkyl methacrylate, cycloaliphatic alkyl acrylate, styrene and any mixture of these monomers; hydroxy containing monomers selected from the group consisting of hydroxy alkyl methacrylate, hydroxy alkyl acrylate each having 1–4 carbon atoms in the alkyl group, and any mixtures of these monomers; and the polymer having a weight average molecular weight of 1,000–15,000 determined by gel permeation chromatography;
   b. 10–50% by weight, based on the weight of the binder of an organic polyisocyanate; and
   wherein the ratio of isocyanate groups of the organic polyisocyanate to hydroxy groups of the of the acrylosilane polymer is 0.4:1 to 1.3:1.

2. The coating composition of claim 1 in which the mono ethylenically unsaturated silane monomer has the following structural formula:

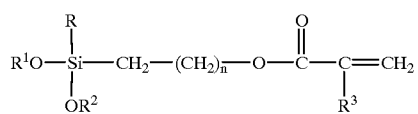

wherein:
   R is selected from the group consisting of $CH_3$, $CH_3CH_2$, $CH_3O$, and $CH_3CH_2O$;
   $R^1$ and $R^2$ are individually selected from the group consisting of $CH_3$, and $CH_3CH_2$; and
   $R^3$ is selected from the group consisting of H, $CH_3$, and $CH_3CH_2$ and n is 0 or a positive integer of 1–10.

3. The coating composition of claim 2 in which the silane monomer is selected from the group consisting of gamma trimethoxy silyl propyl methacrylate and gamma trimethoxy silyl propyl acrylate.

4. The coating composition of claim 2 in which the acrylosilane polymer consists essentially of 35–75% by weight, based on the weight of the acrylosilane polymer, of polymerized monomers selected from the group consisting of alkyl acrylates, alkyl methacrylates each having 1–8 carbon atoms in the alkyl group and styrene, 20–40% by weight, based on the weight of the acrylosilane polymer of polymerized monomers selected from the group consisting of hydroxy alkyl methacrylates and hydroxy alkyl acrylates each having 1–4 carbon atoms in the alkyl groups and 5–25% by weight, of the mono ethylenically unsaturated silane monomer.

5. The coating composition of claim 4 in which the organic polyisocyanate is the trimer of hexamethylene diisocyanate or the trimer of isophorone diisocyanate.

6. The coating composition of claim 5 containing 0.1–5% weight, based on the weight of the binder of a mixture of catalysts of a blocked sulfonic acid catalysts and aryl or alkyl acid phosphate.

7. The coating composition of claim 6 in which the blocked acid catalyst is a blocked dodecyl benzene sulfonic acid and the aryl acid phosphate is phenyl acid phosphate.

8. The coating composition of claim 2 which contains about 1–10% by weight, based on the weight of the binder, of ultraviolet light absorbers.

9. The coating composition of claim 2 in which the
   acrylosilane polymer consists essentially of 35–75% by weight, based on the weight of the acrylosilane polymer, of polymerized monomers selected from the group consisting of alkyl acrylates, alkyl methacrylates each having 1–4 carbon atoms in the alkyl group and styrene, 20–40% by weight, based on the weight of the acrylosilane polymer, of polymerized monomers selected from the group consisting of hydroxy alkyl methacrylates and hydroxy alkyl acrylates each having 1–4 carbon atoms in the alkyl groups and 5–25% by weight, of the mono ethylenically unsaturated silane monomer and
   the organic polyisocyanate is the trimer of hexamethylene diisocyanate or the trimer of isophorone diisocyanate and
   the coating composition contains 0.1–5% weight, based on the weight of the binder, of a mixture of catalysts of a blocked sulfonic acid catalyst and aryl or alkyl acid phosphate.

10. A two component coating composition comprising
   Component A of an acrylosilane polymer consisting essentially of 35–75% by weight, based on the weight of the acrylosilane polymer of polymerized monomers selected from the group consisting of alkyl acrylates, alkyl methacrylates each having 1–4 carbon atoms in the alkyl group and styrene, 20–40% by weight, based on the weight of the acrylosilane polymer of polymerized monomers selected from the group consisting of hydroxy alkyl methacrylates and hydroxy alkyl acrylates each having 1–4 carbon atoms in the alkyl groups and 5–25% by weight, of the mono ethylenically unsaturated silane monomer and containing 0.1–2% by weight, based the weight of component A, of a blocked dodecyl benzene sulfonic acid and
   Component B consisting of an organic polyisocyanate of the trimer of hexamethylene diisocyanate or the trimer of isophorone diisocyanate and containing 0.1–2% by weight, based on the weight of Component B, of an aryl acid phosphate catalyst;
   wherein components A and B are thoroughly mixed together to form a coating composition before application.

11. A substrate having a based coat layer of a pigmented coating composition and topcoated with the coating composition of claim 1.

* * * * *